US007963651B2

(12) United States Patent
Lerner (10) Patent No.: US 7,963,651 B2
(45) Date of Patent: Jun. 21, 2011

(54) EYEWEAR WITH WIRE FRAME INSERTED INTO SLOTS IN LENSES

(75) Inventor: Ira S. Lerner, Marina Del Rey, CA (US)

(73) Assignee: ISL Technologies, LLC, Brooklyn, NY (US)

(*) Notice: Subject to any disclaimer, the term of this patent is extended or adjusted under 35 U.S.C. 154(b) by 0 days.

(21) Appl. No.: 12/701,123

(22) Filed: Feb. 5, 2010

(65) Prior Publication Data
US 2010/0225877 A1 Sep. 9, 2010

Related U.S. Application Data (60) Provisional application No. 61/150,539, filed on Feb. 6, 2009.

(51) Int. Cl.
*G02C 1/04* (2006.01)
(52) U.S. Cl. ............. 351/106; 351/83; 351/86; 351/103
(58) Field of Classification Search .................. 351/110, 351/108, 109, 106, 103, 111, 41, 158, 83, 351/86; 2/447, 10, 13, 431, 439
See application file for complete search history.

(56) References Cited

U.S. PATENT DOCUMENTS

| 3,233,249 | A | * | 2/1966 | Baratelli et al. ................... 2/443 |
| 5,297,298 | A | * | 3/1994 | Salatka et al. ..................... 2/447 |
| 5,367,344 | A | | 11/1994 | Fuchs |
| 5,471,257 | A | | 11/1995 | Houmand |
| 5,748,280 | A | | 5/1998 | Herman |
| 6,334,679 | B2 | | 1/2002 | Masunaga et al. |
| 6,644,805 | B2 | | 11/2003 | Nakamura |
| 7,044,596 | B2 | | 5/2006 | Park |
| 7,207,672 | B2 | | 4/2007 | Lee |
| 7,329,000 | B2 | * | 2/2008 | Actis-Datta ..................... 351/86 |
| 2006/0139566 | A1 | * | 6/2006 | Actis-Datta ..................... 351/41 |

FOREIGN PATENT DOCUMENTS

DE 298 23 238 U1 2/1999
GB 435 105 A 9/1935

OTHER PUBLICATIONS

International Search Report and Written Opinion; International App. No. PCT/US2010/023313; dated Apr. 13, 2010; 9 pages.

* cited by examiner

*Primary Examiner* — Hung X Dang
(74) *Attorney, Agent, or Firm* — Knobbe, Martens, Olson & Bear, LLP (57) ABSTRACT

A rimless eyeglass assembly is constructed using a first lens and a second lens with slotted openings for receiving a wire. A wire having a first end and a second end is inserted into the slotted openings of the first and second lens to form an entire pair of eyeglasses.

16 Claims, 6 Drawing Sheets

EYEWEAR WITH WIRE FRAME INSERTED INTO SLOTS IN LENSES

RELATED APPLICATIONS

The present application claims the priority benefit under 35 U.S.C. §119(e) of U.S. Provisional Patent Application No. 61/150,539, filed Feb. 6, 2009, which is hereby incorporated by reference in its entirety. The present application also incorporates by reference in its entirety U.S. Provisional Patent Application No. 61/150,452, filed on Feb. 6, 2009 and U.S. application Ser. No. 12/701,091, filed concurrently with the present application, entitled EYEWEAR WITH WIRE FRAME THREADED THROUGH LENSES.

BACKGROUND OF THE INVENTION

1. Field of the Invention

The present invention generally relates to eyewear. More particularly, the present invention relates to eyewear in which a wire frame is inserted into slots formed in lenses.

2. Description of the Related Art

Traditionally, rimless eyeglasses have been formed by drilling holes or notches into the eyeglass lenses and using threaded fasteners or screws to attach the ear stems (also called "temples") and bridge to the left and right lenses. Alternatively, plastic plugs that fit into rigid pins by press-fit means or compression have been used to connect the temples and bridge members to the lenses. This method is commonly referred to in the industry as a "compression mounting system" or a "compression mount". As a further alternative, some methods of construction have used chemical bonding, fusing, glue and other adhesive methods to attach the temples and bridge to the lenses.

Although rimless eyewear is popular, the threaded fasteners or screws used to attach the temples and bridge in rimless eyewear often disadvantageously loosen over time, requiring constant maintenance, tightening and adjustment. Compression mounting systems used in rimless eyewear also disadvantageously loosen over time, often requiring a skilled technician to tighten or replace the components. In addition, rimless mounting systems that use chemical bonding, glue and other adhesives, can be disadvantageously time consuming and costly to make, often requiring expensive and specialized equipment as part of the manufacturing process.

SUMMARY OF THE INVENTION

Certain features, aspects and advantages of an embodiment of the present invention advantageously provide rimless eyewear assembly in which the lenses are formed with open ended slots or notches that allow a wire to be positioned in the lenses easily by hand or machine without threading into holes. Because certain features, aspects and advantages of an embodiment of the present invention use open slots or notches, instead of holes, the wire can be pre-formed and dropped in place either by hand or by machine. Machinery used to make eyewear assemblies that are arranged and configured in accordance with embodiments of the present invention is less costly than the machinery necessary to thread a wire in and out of holes that are drilled in the lenses.

In some embodiments that are arranged and configured in accordance with certain features, aspects and advantages of the present invention, eyewear comprises a first lens, a second lens and a frame connecting the first lens to the second lens. The first and second lenses are generally rigid and the frame comprises a wire. The first lens comprises a first slotted opening and a second slotted opening that are spaced apart in a first lens width direction. The second lens comprises a third slotted opening and a fourth slotted opening that are spaced apart in a second lens width direction. The wire extends through the first slotted opening of the first lens and the fourth slotted opening of the second lens.

BRIEF DESCRIPTION OF THE DRAWINGS

These and other features, aspects and advantages of the present invention will now be described with reference to the drawings of several preferred embodiments, which embodiments are intended to illustrate and not to limit the invention. In the drawings.

DETAILED DESCRIPTION OF THE PREFERRED EMBODIMENT

Figure 1:
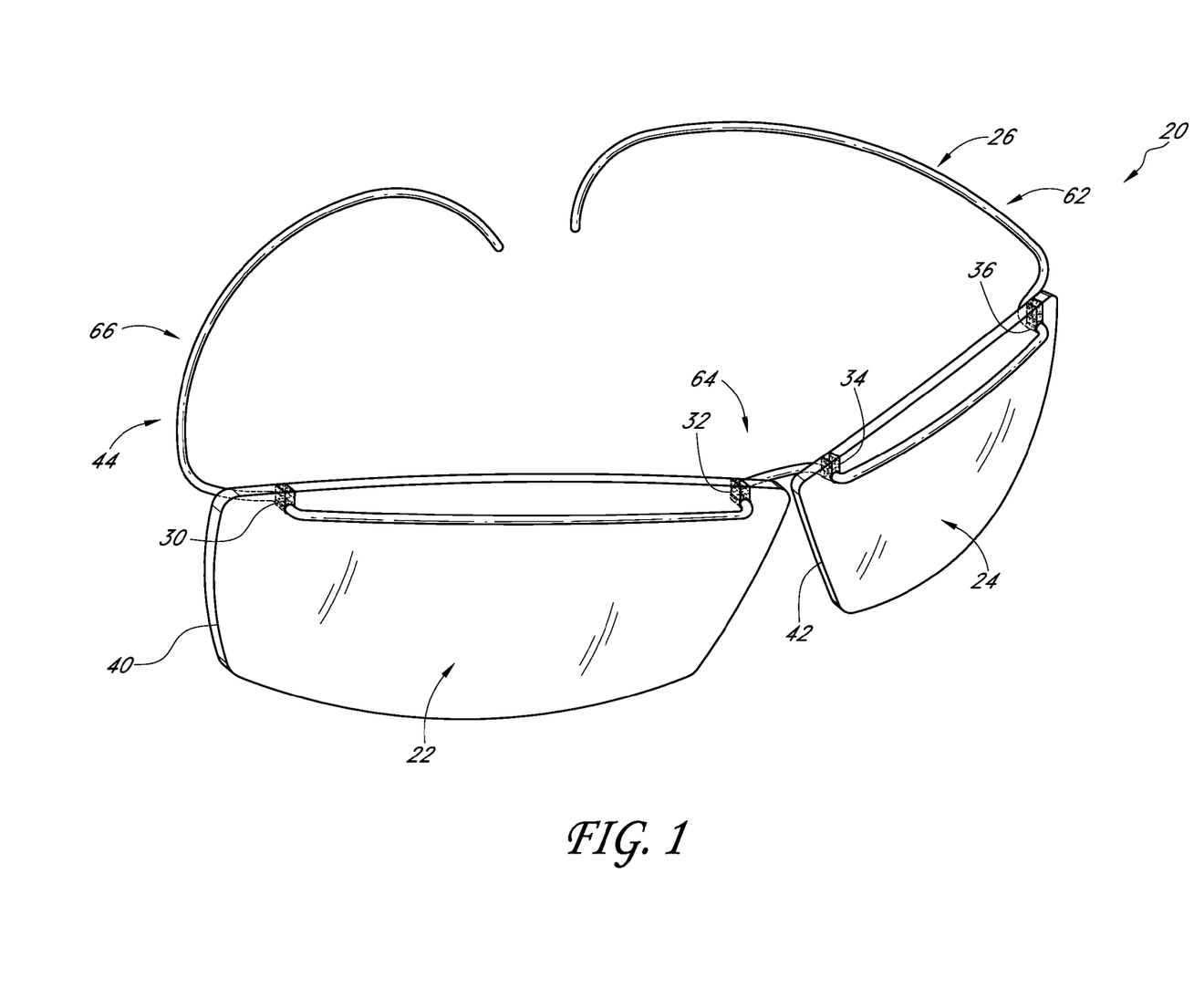
FIG. 1 is a perspective view showing eyewear that is arranged and configured in accordance with certain features, aspects and advantages of an embodiment of the present invention.

With reference initially to FIG. 1, eyewear 20 arranged and configured in accordance with an embodiment of the present invention comprises a first lens 22, a second lens 24 and a frame 26. The eyewear 20 features a very sleek and modern appearance while also having very few components, which improves the reliability of the eyewear and significantly reduces the weight of the eyewear.

The lenses 22, 24 can have any suitable configuration. Preferably, the lenses 22, 24 are generally rigid and/or substantially rigid. More preferably, the lenses 22, 24 are more rigid than the frame 26 such that the frame 26 cannot cause the lenses 22, 24 to bend substantially or in a manner that would cause difficulties with prescription lenses. In some configurations, the lenses 22, 24 are constructed to be shatter-resistant. The lenses 22, 24 can be configured for various vision correcting purposes, for purposes such as glare reduction, magnification, protection from UV rays, lighter weights, as well as for aesthetic reasons such as thinness of the lenses, tints and coloring of the lenses.

The first lens 22 preferably comprises a first slot 30 and a second slot 32 that are spaced apart in a lens width direction. Preferably, the first and second slots 30, 32 of the first lens 22 are spaced apart by more than half of the total dimension of the full lens width. In the illustrated configuration, the first slot 30 is proximate a temple side of the first lens 22 while the second slot 32 is proximate a nasal side of the first lens 22. Similarly, the second lens 24 comprises a first slot 34 and a second slot 36, wherein the first slot 34 is proximate a temple side of the second lens 24 and the second slot 36 is proximate a nasal side of the second lens 24. The first and second slots 34, 36 of the second lens 24 preferably are similarly spaced as the first and second slots 30, 32 of the first lens 22. Symmetry is preferred by not necessary. Asymmetric slot placement can provide for different aesthetic appearances.

The first lens 22 comprises at least one outer peripheral surface 40 and the second lens 24 comprises at least one outer peripheral surface 42. The at least one outer peripheral surfaces 40, 42 preferably defines a substantially closed outer boundary of the respective lens 22, 24. The first slots 30, 34 and the second slots 32, 36 intersect with the outer peripheral surfaces 40, 42. In one application, at least one of the first and second slots 30, 32 intersects with the outer peripheral surface 40 and at least one of the first and second slots 34, 36 intersects with the outer peripheral surface 42.

More than two slots can be used on the lenses and the wire can be passed through the slots accordingly. The arrangements illustrated in FIGS. 1-6, however, are advantageously easy to manufacture when compared with arrangements comprising more than two slots per lens and the arrangements illustrated in FIG. 1-6 are believed to be sufficiently reliable and strong such that additional slots are not a significant enough improvement in function to warrant the additional manufacturing complexities. Nevertheless, as set forth above, more than two slots can be used and can provide differing and unique appearances.

With reference to FIG. 1, the frame 26 preferably comprises a wire 44 that is inserted into one or more of the first and second slots 30, 32, 34, 36. The wire can have any suitable construction. In some applications, the wire 44 may be a monofilament wire or the wire 44 may be a multifilament or braided wire. In some applications, the wire 44 can be made of a metallic material, including metal alloys, a natural material or a synthetic material, such as nylon, for example without limitation. In some applications, the wire 44 may be encased, encapsulated, or coated, such as where the wire 44 is encased in a rubber or plastic sleeve. In some embodiments, the wire 44 can be partially or fully encased, wrapped, covered and/or braided for decorative reasons and/or for added strength and durability of the eyewear 20. For instance, the encasement, wrapping, covering and/or braiding can increase a frictional interface between the wire 44 and the associated lens or lenses 22, 24, which helps reduce the likelihood of the lens or lenses 22, 24 shifting relative to the wire 44 over time. In a preferred configuration, the wire 44 can be bent and assumes the bent shape. In other words, the wire 44 yields when bent rather than restores to its original shape when released. The bending of the wire 44 assists in locking the lenses 22, 24 in position relative to the frame 26.

The wire 44 can have any suitable shape. For example, the wire 44 can have a regular or an irregular cross-section. In other words, the cross-sectional shape can be constant or can vary over its length. In some embodiments, the wire 344 has a substantially constant cross-section that is round, oval, rectangular, square or generally flat. For example, the wire 144 can comprise a generally flattened shape. Other shapes also can be used. In certain preferred embodiments, a series of slots 130, 132, 134, 136 can be shaped to generally correspond to the cross-sectional shape of the wire 144. The shaped holes 130, 132, 134, 136 (e.g., square or rectangular) can be formed using laser cutting machinery or the like. Other configurations are possible.

With reference again to FIG. 1, the wire 44 also can have any suitable size. In the embodiment shown in FIG. 1, the wire 44 is substantially cylindrical and the wire 44 has a diameter of between about 0.7 millimeters and about 3.0 millimeters. In one embodiment, the wire 44 has a diameter of about 0.7 millimeters. In another embodiment, the wire 44 has a diameter of about 0.35 millimeters. In yet another embodiment, the wire 44 has a diameter of about 3.0 millimeters.

Figure 2:
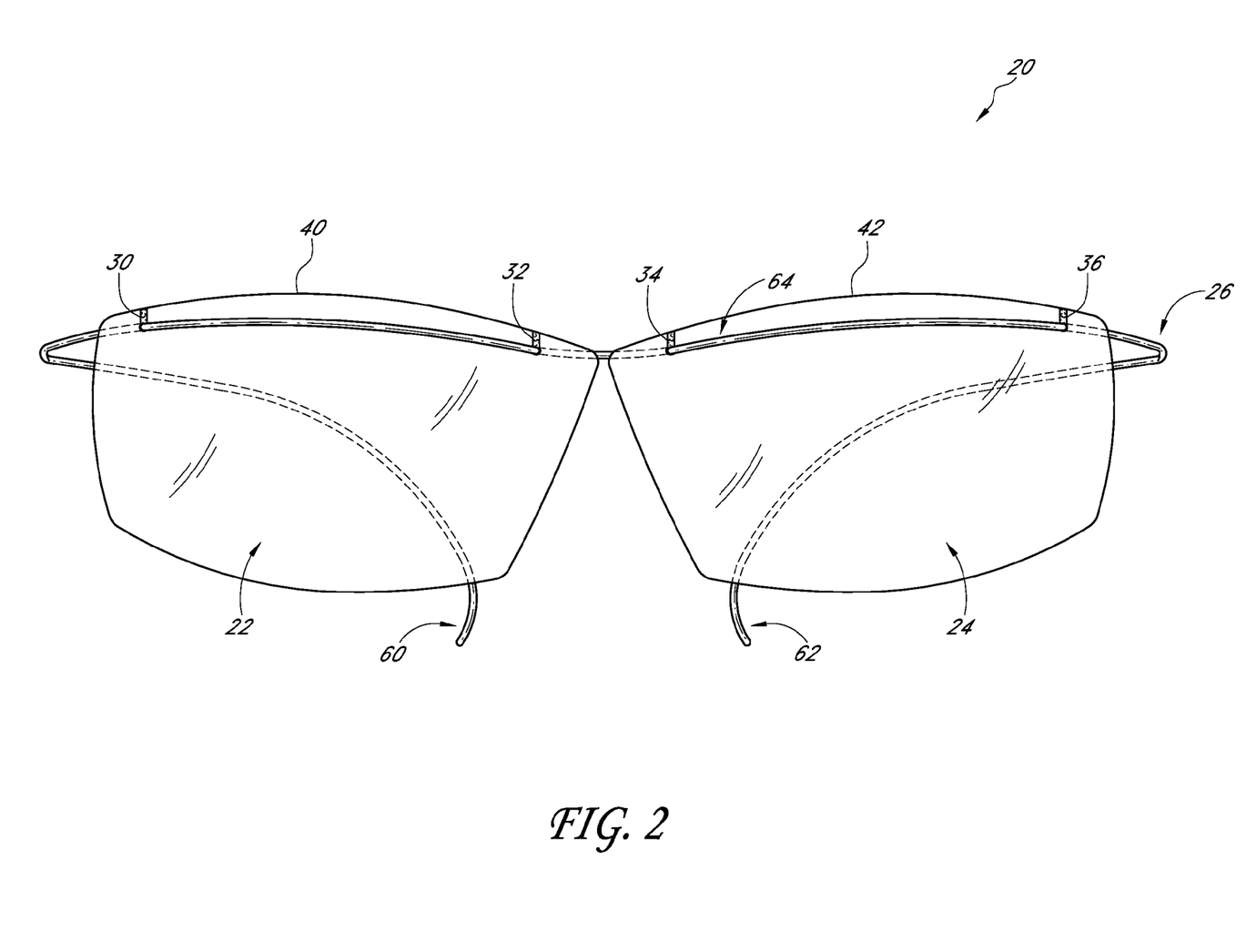
FIG. 2 is a front view of the eyewear of FIG. 1.
Figure 3:
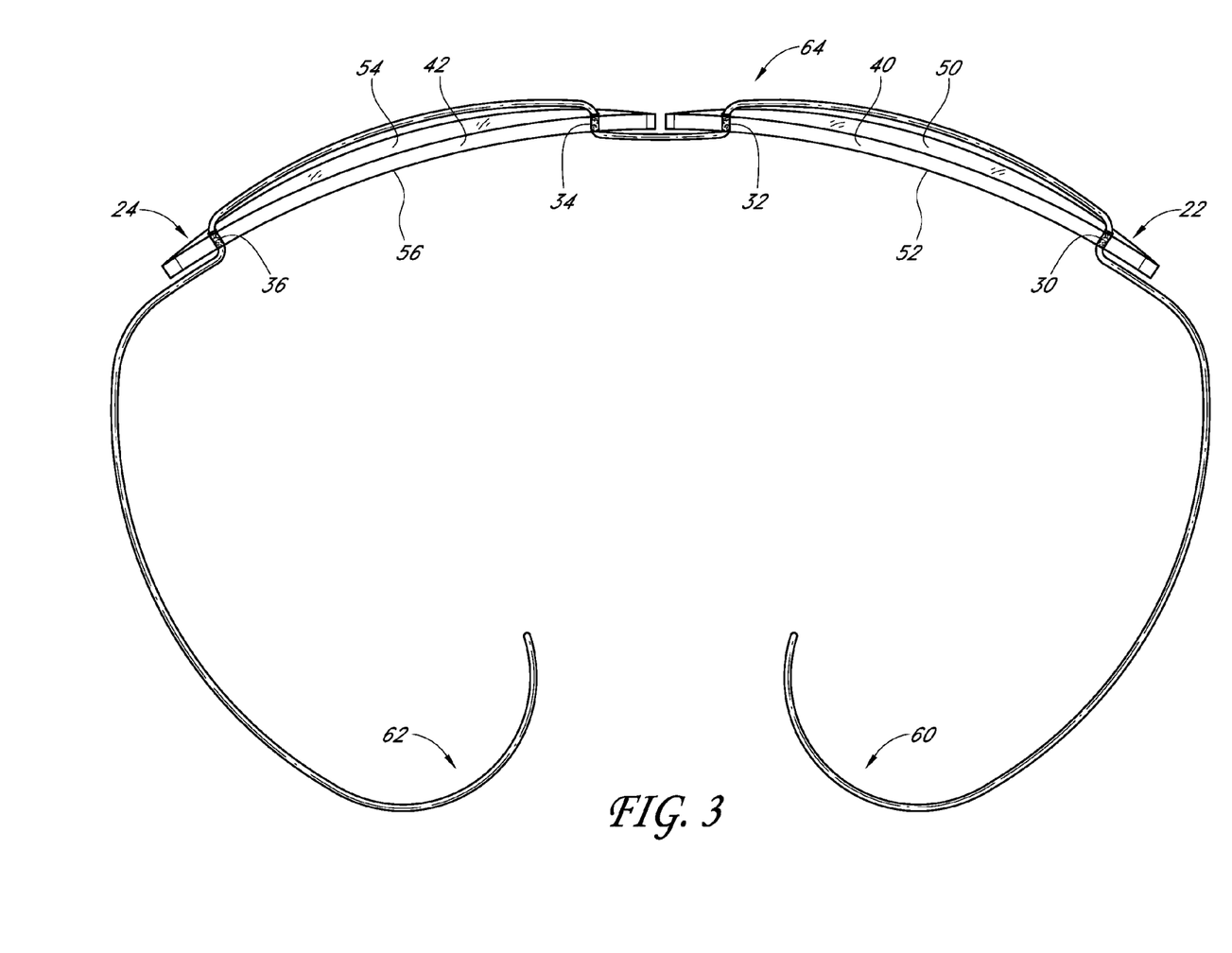
FIG. 3 is a top view of the eyewear of FIG. 1.

With reference still to FIGS. 1-3, the wire 44 used to form the frame 26 preferably has a one-piece configuration. In some embodiments, however, the length of the wire 44 can be formed by portions or sections such that a middle portion 64 connects to both lenses 22, 24 and two end portions 60, 62 are joined to the middle portion 64 in any suitable manner such that the two end portions 60, 62 can form temples. In such an embodiment, the end portions 60, 62 of the wire can be of a different material, shape and/or construction. The end portions 60, 62 can be secured to the middle portion 64 by a mechanical fastener, a hinge, or any other suitable technique.

With reference to FIG. 3, the first lens 22 comprises a forward facing surface 50 and a rearward facing surface 52 and the second lens 24 comprises a forward facing surface 54 and a rearward facing surface 56. The first end 60 of the wire 44 approaches the rearward facing surface 52 of the first lens 22 near the temple-side first slot 30. The wire 44 passes from rear to front through the first slot 30 and then the wire 44 passes along the forward facing surface 50 of the first lens 22 until it reaches the nasal side second slot 32 through the first lens 22. The wire 44 passes through the second slot 32 from front to rear such that the central portion 64 of the wire can span a gap between the first lens 22 and the second lens 24 at a location rearward of the first lens 22 and the second lens 24. The wire 44 passes through the nasal side second slot 36 of the second lens 24 from rear to front and then passes along the forward facing surface 54 of the second lens 24. From the forward facing surface 54, the wire 44 passes from front to rear through the temple side slot 34 of the second lens 24. The second end 62 of the wire 44 and the first end 60 of the wire, in the illustrated configuration, form a second temple tip 68 and a first temple tip 66 respectively. Advantageously, the wire 44 in the illustrated configuration extends rearward toward a temple region of a wearer from alongside the rearward surfaces 52, 56 of the first and second lenses 22, 24. Moreover, in the illustrated configuration, the central portion 64 of the wire 44 is positioned rearward of the rearward surfaces 52, 56 of the first and second lenses 22, 24.

Figure 4:
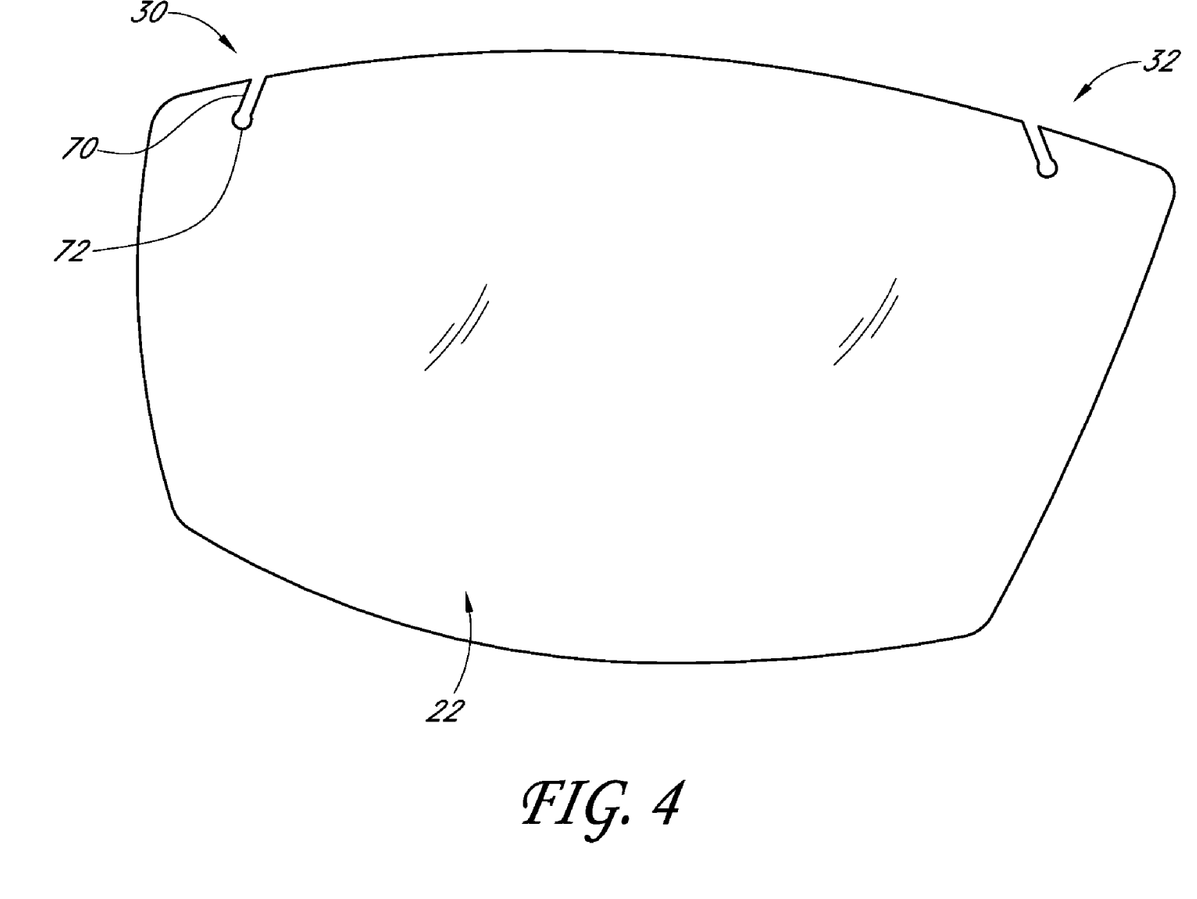
FIG. 4 is a front view of a lens that can be used with the eyewear of FIG. 1 in which the slots are angled relative to each other, wherein the opening of the first and second slots are closer together and the closed portion of the first and second slots are further away from each other.
Figure 5:
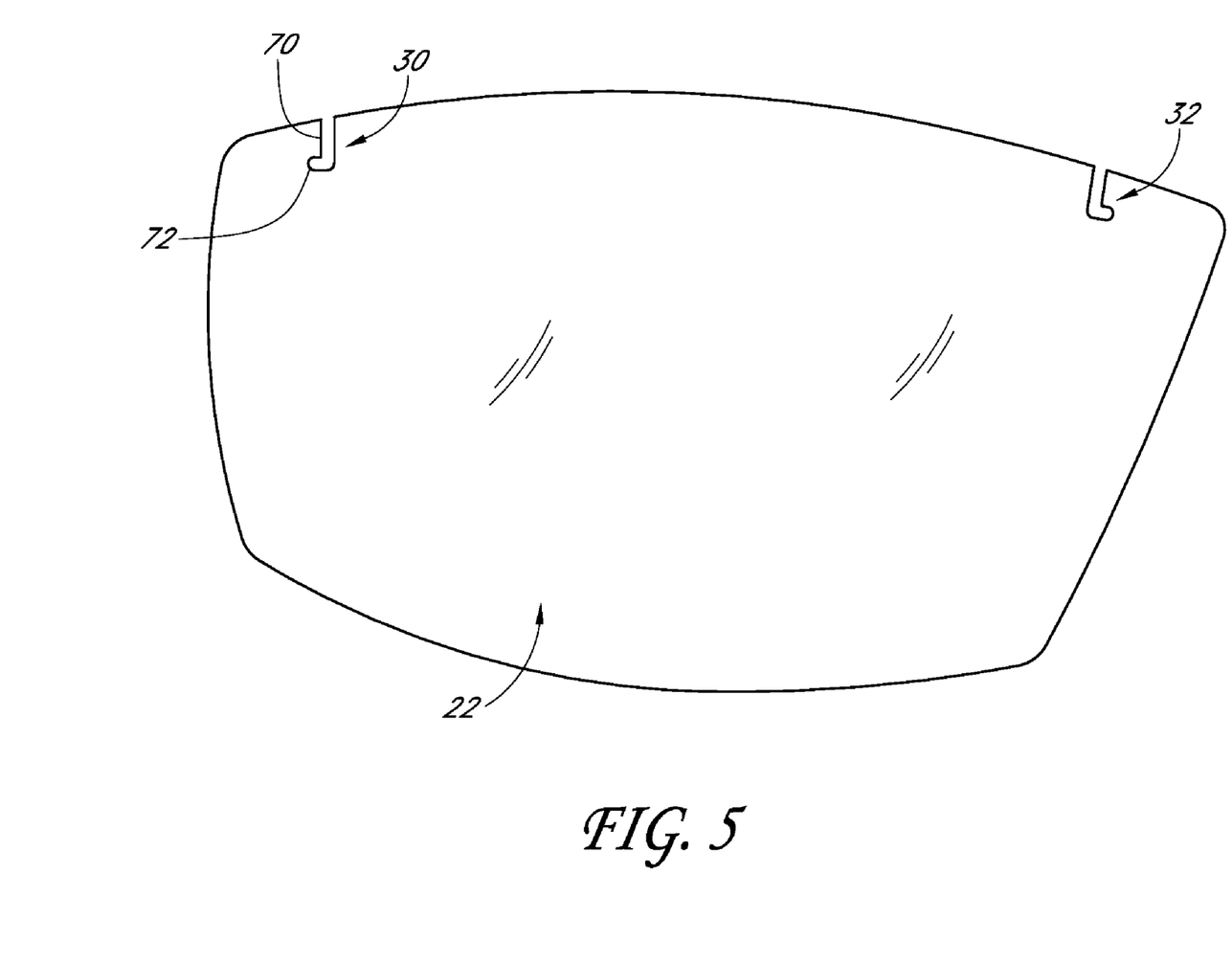
FIG. 5 is a view of another eyewear assembly that is arranged and configured in accordance with certain features, aspects and advantages of an embodiment of the present invention and that comprises temple tips.

With reference to FIGS. 4 and 5, the slots 30, 32 can have any suitable configuration. While the slot configurations will be discussed in the context of the first lens, the slots of the second lens 24 can be similarly configured. The slots 30, 32 can have any suitable configuration. For example, the slots 30, 32 can be rectangular or square and can extend generally normal to the respective peripheral surface 40, 42 as shown in FIGS. 1-3 and 5. In some configurations, the slots 30, 32 can extend at an angle relative to the peripheral surface 40, 42 as shown in FIG. 4. Preferably, the slots 30, 32 extend in non-parallel directions with each other. For example, as shown in FIG. 4, one slot 30 can extend downward and to the left while the other slot 32 can extend downward and to the right. In such a construction, the spring action of a suitably formed wire can secure the wire in the lower portion of the slots and reduce the likelihood of the wire being dislodged from the slots.

With reference to FIGS. 4 and 5, in configurations have slots 30, 32 that are not uniform in configuration, the slots 30, 32 may be formed with different shapes between a neck region 70 and a bottom region 72. For example, the slots 30, 32 may also have a larger bottom region 72 compared to the neck region 70, which results in a keyhole shape. Moreover, as shown in FIG. 5, the bottom region 72 can be offset compared to the neck region 70, which provides another keyhole shape. Preferably, the wire in cross-section at the corresponding location is smaller than the bottom region but larger than the neck region. More preferably, the neck region is smaller than the bottom region and the cross-section of the corresponding portion of the wire. The keyhole shapes allow the wire to snap into place within the slots 30, 32, for example. In some configurations, the wire is press-fit into the slots 30, 32. Such configurations make it difficult for the wire to disengage itself from the lens. In this method, it is desirable for the slot and keyhole opening to be an asymmetric shape.

In some configurations, such as those shown in FIGS. 1-3 and 6, the wire can be secured in position by filling the open portion of the slot above the wire with a compatible lens bonding material, such as a resin, polymer, adhesive or other suitable lens bonding material that will form a bond or adhesive with the existing lens material. In other configurations, the wire can be secured with mechanical components or through to a mechanical assembly, for example.

Figure 6:
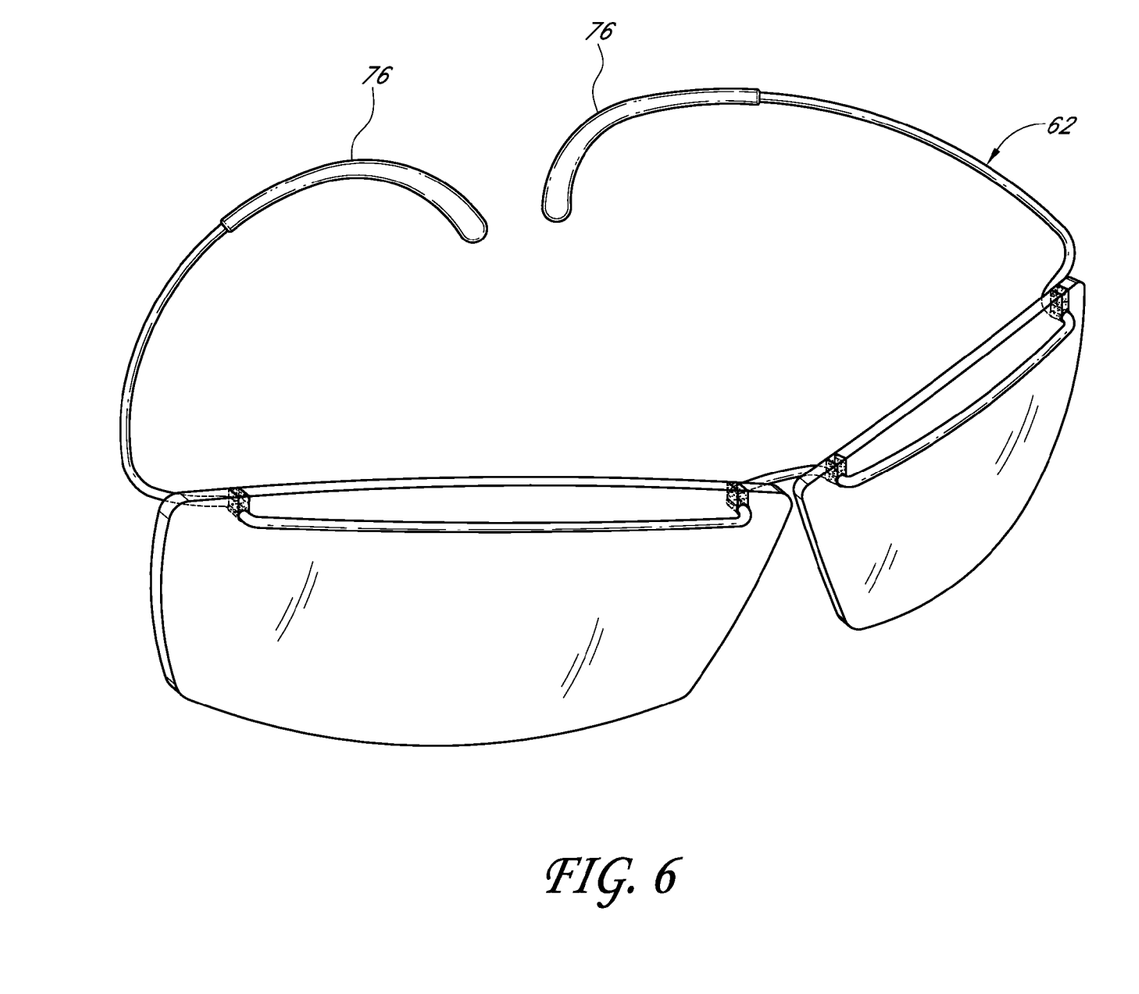
FIG. 6 is a front view of a lens that can be used with the eyewear of FIG. 1 in which a first slot is formed in an "L" shape and a second slot is formed as a mirror image of an "L" shape.

With reference to FIG. 6, plastic or metal temple tips 76 may be added to the ends of the wire 62 for comfort. Each of the temple tips 76 may be constructed as a sleeve into which an end of the wire 62 is inserted. The temple tips 76 also may use a snap-on construction that is secured by press-fit means. The temple tips 76 may also be secured by pressure, glue or other adhesive, soldering, welding or any other suitable technique.

While not shown, plastic or metal nose pads may be added to the eyewear assembly. In some configurations, holes can be formed near the nasal area of each lens and a nose pad can be attached to the lenses through press-fitting, threaded fasteners, compression mounting or any other suitable technique.

In some embodiments, the wire can be bent prior to insertion into the slots. In such a configuration, assembly by a machine can be facilitated. The wire can be formed into desired dimensions such that the wire can be slid into the slots and the lenses can be secured to the wire as discussed above. Alternatively, the wire can be bent one slot at a time. Such a configuration is more likely to be used in a manual assembly but could be used in a machine-based manufacturing environment as well.

Although the present invention has been disclosed in the context of certain preferred embodiments, examples and variations, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. For example, certain features of the present invention can be used with a single lens, such as a shield-style lens. It is also contemplated that various combinations or subcombinations of the specific features and aspects of the embodiments may be made and still fall within the scope of the invention. It should be understood that various features and aspects of the disclosed embodiments can be combined with or substituted for one another in order to form varying modes of the disclosed invention. It also should be understood that various features and aspects of the embodiments disclosed in the applications incorporated by reference above can be combined with or substituted for one another in order to form varying eyewear configurations. Moreover, some variations that have been described with respect to one embodiment and not another embodiment can be used with such other embodiments. Many other variations also have been described herein and cross-application is intended where physically possible. Thus, it is intended that the scope of the present invention herein disclosed should not be limited by the particular disclosed embodiments described above, but should be determined only by a fair reading of the claims that follow.

What is claimed is:

1. Eyewear comprising a first lens, a second lens and a frame connecting the first lens to the second lens, the first and second lenses being generally rigid, the frame comprising a wire, the first lens comprising a first slotted opening and a second slotted opening spaced apart in a first lens width direction, the second lens comprising a third slotted opening and a fourth slotted opening spaced apart in a second lens width direction, and each of the first slotted opening, the second slotted opening, the third slotted opening and the fourth slotted opening comprising a keyhole shape that allows the wire to snap into place within the first slotted opening, the second slotted opening, the third slotted opening and the fourth slotted opening.

2. The eyewear of claim 1, wherein the first slotted opening of the first lens is positioned proximate a temple side of the first lens and the fourth slotted of the second lens is positioned proximate a temple side of the second lens.

3. The eyewear of claim 2, wherein the second slotted opening of the first lens is positioned proximate a nasal side of the first lens and the third slotted opening of the second lens is positioned proximate a nasal side of the second lens.

4. The eyewear of claim 1, wherein the first slotted opening intersects with an outer peripheral surface of the first lens and the fourth slotted opening intersects with an outer peripheral surface of the second lens.

5. The eyewear of claim 4, wherein the first slotted opening intersects with a portion of the outer peripheral surface of the first lens that defines an upper surface of the first lens and the fourth slotted opening intersects with a portion of the outer peripheral surface of the second lens that defines an upper surface of the second lens.

6. The eyewear of claim 4, wherein the second slotted opening intersects with the outer peripheral surface of the first lens and the third slotted opening intersects with the outer peripheral surface of the second lens.

7. The eyewear of claim 6, wherein the second slotted opening intersects with the portion of the outer peripheral surface of the first lens that defines the upper surface of the first lens and the third slotted opening intersects with the portion of the outer peripheral surface of the second lens that defines the upper surface of the second lens.

8. The eyewear of claim 1, wherein the first slotted opening and the second slotted opening of the first lens are spaced apart by at least half of a full lens width of the first lens.

9. The eyewear of claim 1, wherein each of at least the first and fourth slotted openings comprise a keyhole shape that intersects an outer peripheral surface of the first and second lenses respectively.

10. The eyewear of claim 1, wherein the first lens comprises a forward facing surface and at least a portion of the wire extends along the forward facing surface between the first and second slotted openings.

11. The eyewear of claim 1, wherein a first portion of the wire extends rearward from the first lens and a second portion of the wire extends rearward from the second lens, the first portion of the wire defining a first temple tip and the second portion of the wire defining a second temple tip.

12. The eyewear of claim 1, wherein a first portion of the wire extends rearward from the first lens and a second portion of the wire extends rearward from the second lens, the first portion of the wire being connected to a first temple tip and the second portion of the wire being connected to a second temple tip.

13. The eyewear of claim 1, wherein the at least a portion of the first slotted opening and the fourth slotted opening is filled to secure the wire in position within the first slotted opening and the fourth slotted opening.

14. The eyewear of claim 1, wherein the second slotted opening of the first lens and the third slotted opening of the second lens are positioned generally between the first slotted opening of the first lens and the fourth slotted opening of the second lens.

15. The eyewear of claim 1, wherein a portion of the wire extending through the first slotted opening has a first cross-sectional dimension and the first slotted opening has a neck region and a bottom region, the neck region comprising a second cross-sectional dimension, the second cross-sectional dimension not being larger than the first cross-sectional dimension.

16. The eyewear of claim 15, wherein the second cross-sectional dimension is smaller than the first cross-sectional dimension.

* * * * *